United States Patent [19]

Maccianti et al.

[11] Patent Number: 5,115,498
[45] Date of Patent: May 19, 1992

[54] LOCAL MEMORY FAST SELECTING APPARATUS INCLUDING A MEMORY MANAGEMENT UNIT (MMU) AND AN AUXILIARY MEMORY

[75] Inventors: Tiziano Maccianti, Pregnana Milanese; Angelo Oldani, Ossona, both of Italy

[73] Assignee: Bull HN Information Systems Inc., Billerica, Mass.

[21] Appl. No.: 315,996

[22] Filed: Feb. 27, 1989

[30] Foreign Application Priority Data

Mar. 15, 1988 [IT]  Italy .................. 19770 A/88

[51] Int. Cl.$^5$ .................. G06F 12/00; G11C 8/00
[52] U.S. Cl. .................. 395/425; 365/230.03; 365/230.06; 364/243; 364/964
[58] Field of Search ........ 365/230.06, 230.01, 365/230.03; 364/200 MS File, 900 MS File

[56] References Cited

U.S. PATENT DOCUMENTS

| | | | |
|---|---|---|---|
| 4,050,094 | 9/1977 | Bourke | 364/200 |
| 4,868,739 | 9/1989 | Kish et al. | 364/200 |
| 4,928,224 | 5/1990 | Zulian | 364/200 |
| 4,961,172 | 10/1990 | Shubat et al. | 365/230.06 |

FOREIGN PATENT DOCUMENTS 0200440 11/1986 European Pat. Off. .

OTHER PUBLICATIONS

Gay, "M68000 Family Memory Management-Part I", Electronic Engineering, vol. 58, No. 714, Jun. 1986, pp. 39-48.

Primary Examiner—Glenn Gossage
Attorney, Agent, or Firm—J. S. Solakian; J. H. Phillips

[57] ABSTRACT

A local memory fast selection apparatus is utilized in a data processing system having a plurality of memory resources including a local memory and addressing by logical/virtual addresses which are converted into physical addresses. The local memory fast selection apparatus comprises a memory management unit (MMU) for converting a logical address in a physical address and for generating a destination code which identifies the memory resource, and an auxiliary memory having the same number of addressable locations of the MMU and loaded together with the MMU. The auxiliary memory has a physical address corresponding to the logical address by which the MMU is addressed and a destination code. The auxiliary memory stores a bit decoded from the destination code and selects a predetermined memory resource. Thus, the auxiliary memory and the MMU can be read out together with the same logical address in order to jointly obtain a physical address from the MMU and a selection signal of the predetermined memory resource from the auxiliary memory without any delay caused by decoding operations.

3 Claims, 2 Drawing Sheets

5,115,498

LOCAL MEMORY FAST SELECTING APPARATUS INCLUDING A MEMORY MANAGEMENT UNIT (MMU) AND AN AUXILIARY MEMORY

FIELD OF THE INVENTION

The present invention relates to data processing systems and, more particularly, to local memory fast selecting apparatus in data processing systems which makes use of the virtual memory concept.

BACKGROUND OF THE INVENTION

It is known that, in data processing systems using the virtual memory concept, a logical or virtual address generated by a central processing unit, or CPU, is converted or translated by a memory management unit, or MMU, into a physical address. Depending on the logical address received as an input, the MMU produces as outputs not only the physical address, but also a binary code (destination code) which defines a destination space, for instance, in a multiprocessor system, a memory space internal to the processor which has generated the (logical) address or a memory space of one among other processors. In addition, a field (logical space code) of the logical address, which is not used for the generation of the physical address, defines, within the destination space, a logical space and indicates if the address is related to a working memory or local memory space, to a register space or other resources space.

The destination code issued from the MMU and the logical space code are decoded by a decoder to generate one among a plurality of selection signals, each of which selection signals references and selects the appropriate resource for execution of the requested operation. This decoding operation requires appreciable time. With the availability on the market of integrated circuit components, particularly microprocessors, which evolve to models with improved operating speed performances (while still retaining full logical compatibility with earlier components of the same kind), the problem arises of fully exploiting the higher performances offered by the new components. This end has to be obtained without changing the operating system, the logical structure of the addresses, to assure compatibility of the most recent products with the previous ones, and possibly without any hardware change or with minor changes to the hardware.

A substantive limitation in exploiting the higher speed of the improved microprocessors is imposed by the mechanism through which they communicate with working memories. It is well known that, even if the technology evolution makes available faster memory components, this progress does not keep pace with the new requirements imposed by faster microprocessors. For the most part, this is also true for conventional electronic components such as AND-gates, OR-gates, etc.

OBJECTS OF THE INVENTION

It is therefore an object of the present invention to increase the speed of operation of working memory selection by zeroing the decoding time required to generate the memory selection signal.

It is a more specific object of the invention to achieve this result without changing the address structure and the operating system, but rather with minor circuit changes and the addition of a single integrated circuit component or memory chip acting as auxiliary memory or parallelism expansion of a conventional MMU.

SUMMARY OF THE INVENTION

Basically the objects of the invention are achieved by predecoding, when the MMU is loaded, the destination code which is written in each addressable location of the MMU. If, as a result of such pre-decoding a memory selection signal is generated, this signal is stored as an information bit into an auxiliary memory or MMU expansion. When the MMU is interrogated for converting a logical address into a physical address, the MMU issues the destination code, and the MMU expansion issues the corresponding memory selection signal which is immediately available, without need to decode the destination code.

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

Figure 1:
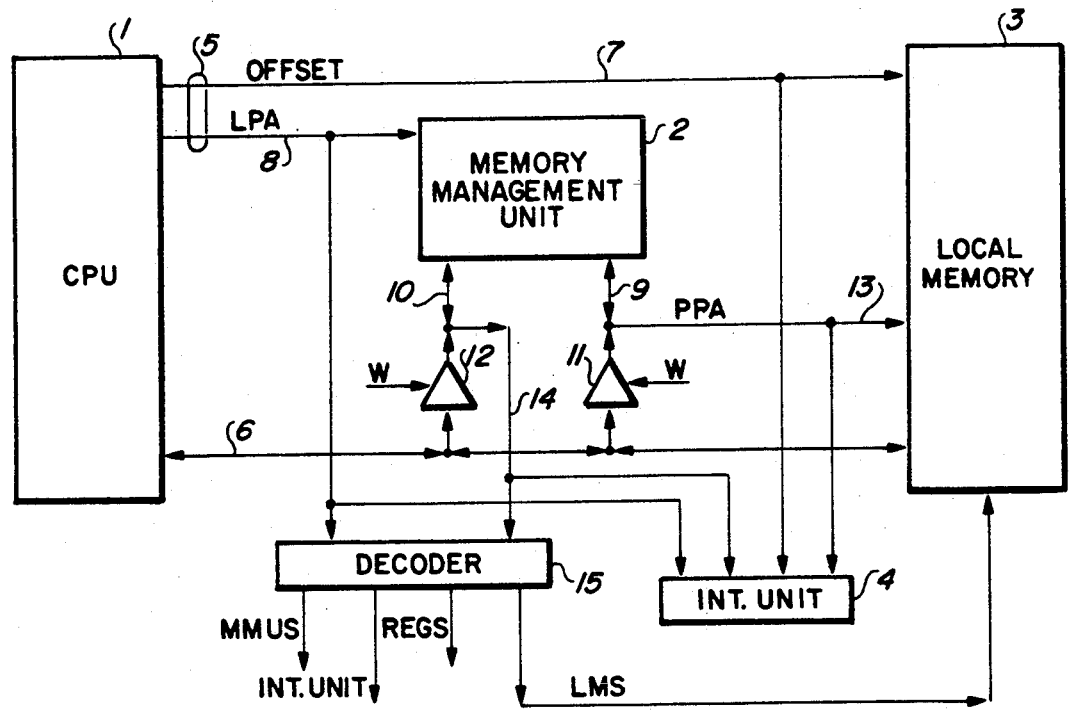
FIG. 1 is a block diagram of a data processing system representative of those known in the art.

Referring now to FIG. 1, there is shown, in simplified block diagram, a data processing system representative of those known in the art, for highlighting certain essential aspects useful to a better understanding of the invention. Thus, the system includes a central processing unit or CPU 1, a memory management unit or MMU 2 and a working memory or local memory 3. The central processing unit 2, for instance a 68020 microprocessor manufactured by the United States firm Motorola, communicates with memory 3 and with MMU 2 through an address bus 5 and a data bus 6.

The address bus 5 has two sets of leads, a subchannel 7 and a subchannel 8, for respectively transferring an OFFSET code and a logical page code or address LPA. The OFFSET code is directly forwarded from central processing unit 1 to memory 3, and the logical page code is forwarded as an address for MMU 2. A MMU location corresponds to each MMU 2 address, and a physical page address PPA and a destination code are stored in each location of the MMU and correspond to the related location address.

When the MMU 2 is interrogated at a predetermined address, this information (the related PPA and destination code) is read out from MMU 2 and is available on two output sets 9, 10 respectively. (This information is loaded in the MMU 2 by the central processing unit 1, at system initialization, through the data bus 6 and two tristate gate sets 11, 12 enabled by a write command W from unit 1 ) When the MMU 2 is operative in a read operation, the physical page address PPA, present at output 9, is applied, through bus 13, to memory 3. The physical page address is further sent, together with the OFFSET code, to an interface unit 4 which communicates, through a system BUS, with other system units, not shown and having storage resources which form an "external memory space".

The destination code, at output 10, indicates if the physical address generated by MMU 2 is related to memory 3 or to external memory resources, and this code is provided to a decoder 15 through a channel 14. Decoder 15 further receives a logical space code through channel 8. This information is decoded to generate: in a mutually exclusive manner, one among a plurality of signals MMUS (for write selection of MMU 2); INT UNIT (for selection of the interface unit 4); REGS (for selection of register banks, not shown); and LMS for selection of the local memory 3.

Signal LMS is applied to local memory 3 and enables it to performs a read or write operation in accordance with a control signal R/W generated by central processing unit 1 and further received by memory 3. The read/write operation is performed at the address defined by the OFFSET code and the physical page address PPA.

The delay caused by decoder 15 hampers the response time of memory 3 to access operations by central processing unit 1; while the delay can be tolerated if the central processing unit 1 operates at a clock rate of, for example, 16 MHz, it may become prejudicial if the same unit operates at a clock rate of 20 or 25 MHz as made possible by the technological evolution.

Figure 2:
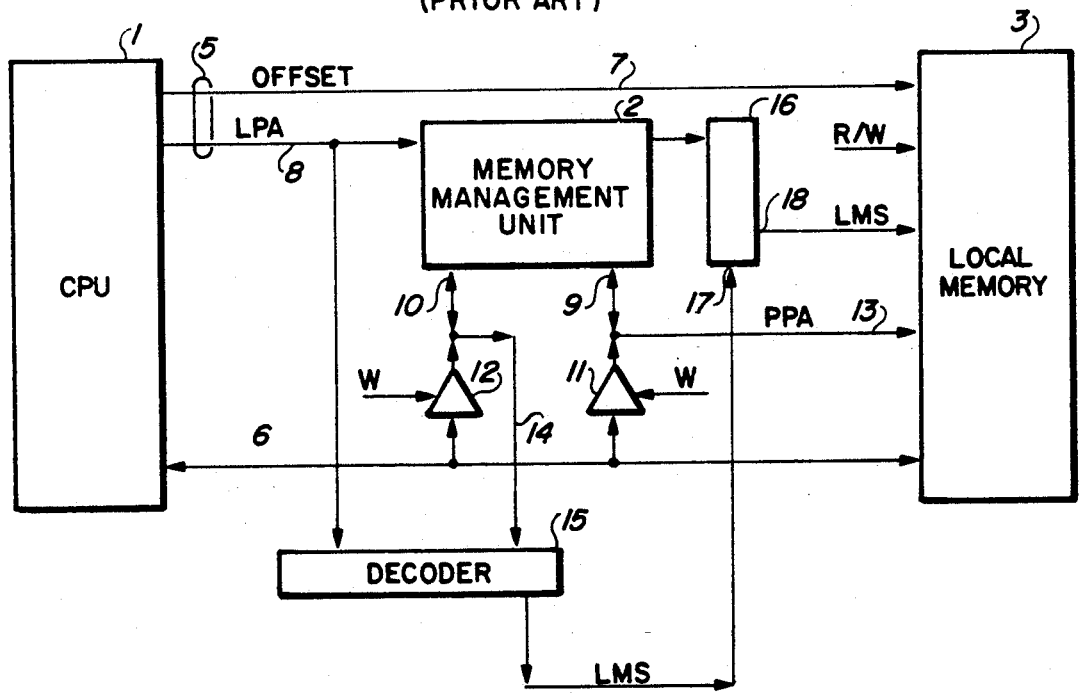
FIG. 2 is a block diagram of the system of FIG. 1, modified to incorporate the memory fast selecting apparatus of the invention.

It therefore becomes necessary that memory 3 be able to read or write information in a faster way. This may be achieved first of all by minimizing the memory selection delay, and FIG. 2 shows the system of FIG. 1 incorporating certain circuit changes made in accordance with the present invention to this end. (Some parts of the system of FIG. 1 are not shown in FIG. 2 because they are not necessary for an understanding of the invention.)

The system of FIG. 2 differs from the system of FIG. 1 basically in that an auxiliary memory 16 has been added to MMU 2. The auxiliary memory 16 may, for instance, consist of a single integrated circuit having a capacity of 16K×1 bit. The capacity, expressed in number of addressable locations or entries, is equal to that of MMU 2 of which auxiliary memory 16 substantially constitutes a parallelism expansion. Auxiliary memory 16 is preferably, although not necessarily, of the type having independent input and output terminals and has an input 17 directly connected to the output of decoder 15, where the memory selection signal LMS is generated. Output 18 of the auxiliary memory 16 is directly connected to the selection input of memory 3.

Auxiliary memory 16 is addressed and controlled exactly as an integral part of MMU 2. Thus, when MMU 2 is written at an initialization stage or in the course of subsequent memory mapping operations, the destination code, which is recorded in MMU 2 through gates 12, is also applied to decoder 15, where it is decoded and the memory selection bit (LMS), asserted or de-asserted, is written by the same operation into auxiliary memory 16.

In the course of subsequent access operations to local memory 3, the addressing of MMU 2 and of the auxiliary memory 16 causes the generation of signal LMS to memory 3 without decoding delay, in that such signal is directly generated by auxiliary memory 16.

Figure 3:
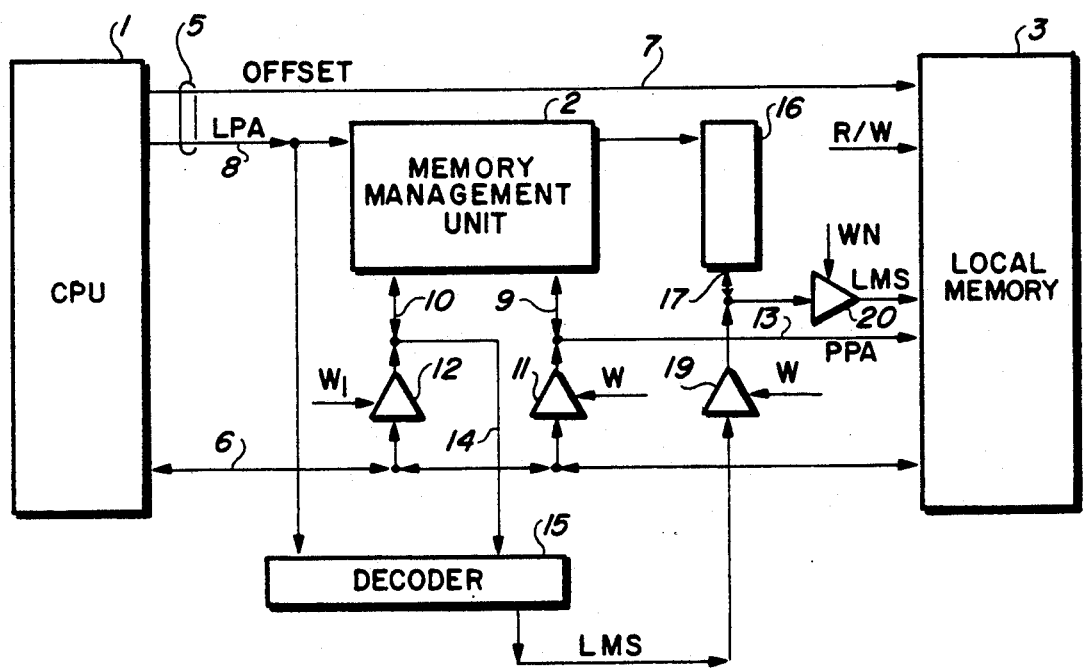
FIG. 3 is a block diagram of a variant of the apparatus of FIG. 2.

FIG. 3 shows the circuit diagram of FIG. 2 with the circuit changes required in case an integrated circuit having a common input/output is used for the auxiliary memory 16. In this case, the output of decoder 15, from which the memory selection signal is issued, is connected to the input/output 17 of auxiliary memory 16 through a tristate gate 19 which is controlled by the same signal W which controls the writing of MMU 2. The input/output 17 is further connected to the selection input of the memory 3 through a logic gate 20.

Gate 20 may be of a tristate type or, depending on the relationship between logically asserted signals and electrical levels, a simple AND gate or NOR gate, controlled by a signal WN (obtained by inversion of the MMU 2 write command W) or by signal W itself. In this case, gate 20 introduces a propagation delay which is, however, less than the one which would have been caused by a decoder such as decoder 15.

It will be clear to those skilled in the art that several changes can be made to the described apparatus. For instance, auxiliary memory 16 may have a parallelism of two or more bits so as to store a plurality of selection bits obtained from decoder 15 in order to issue, when read out and without decoding delay, a selection signal among a plurality of selection signals for selecting one among a plurality of memory resources.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A local memory fast selection apparatus, in a data processing system having a plurality of memory resources including a local memory and addressing by logical/virtual addresses which are converted into physical addresses, including a memory management unit for converting a logical address into a physical address and for generating a destination code which identifies a memory resource to be selected from among said plurality of memory resources, a decoder connected to outputs of said memory management unit for receiving said destination code and for issuing a local memory selection signal, said local memory fast selection apparatus comprising: an auxiliary memory addressed by the same logical address used to address said MMU and having an input connected to an output of said decoder for receiving said local memory selection signal and for storing a bit corresponding to said local memory selection signal when said memory management unit and said auxiliary memory are simultaneously addressed by the same logical address for a write operation, said auxiliary memory having an output connected to said local memory for issuing to said local memory, when said local memory and said auxiliary memory are addressed by the same logical address for a read operation, a selection signal corresponding to the stored bit without any decoding delay.

2. The local memory fast selection apparatus of claim 1 wherein said auxiliary memory has independent input and output terminals, the output of said auxiliary memory being directly connected to a selection input of said local memory.

3. The local memory fast selection apparatus of claim 1 wherein said auxiliary memory has a common input/output, said common input/output being connected to an output of said decoder through a first gate enabled by a write command for said memory management unit, an output of said first gate being connected to a selection input of said local memory through a second gate disabled by a write command for said memory management unit.

* * * * *